UNITED STATES PATENT OFFICE.

EDITH M. WATERMAN AND NETTIE BROWN, OF CENTRALIA, WASHINGTON.

HAIR-TONIC.

No. 921,927.      Specification of Letters Patent.      Patented May 18, 1909.

Application filed March 31, 1908. Serial No. 424,447.

*To all whom it may concern:*

Be it known that we, EDITH M. WATERMAN and NETTIE BROWN, citizens of the United States, residing at Centralia, in the county of Lewis and State of Washington, have invented certain new and useful Improvements in Hair-Tonic, of which the following is a specification.

This invention has for its object to supply a tonic designed more particularly for treating the scalp and to promote the growth of the hair.

In preparing the tonic the following ingredients are combined in the manner and proportions hereinafter stated, namely,

| | |
|---|---|
| *Salvia officinalis* sage leaves | 2% |
| Alcohol, (grain) | 4% |
| Magnetic iron oxid ($Fe_3O_4$) | $\frac{1}{4}$ of 1% |
| Olive oil | $\frac{5}{8}$ of 1% |
| Oil bergamot | $\frac{1}{8}$ of 1% |
| Water | 93% |

The following steps are employed in compounding the ingredients to prepare the tonic: *Salvia officinalis*, the magnetic iron oxid and the water are mixed in a suitable vessel and are heated to the boiling point and maintained at such temperature for approximately an hour, after which the vessel containing the aqueous decoction is removed from the fire and the contents allowed to cool when the decoction is strained or filtered. The alcohol is then added to the the filtered or decanted decoction and thoroughly incorporated therewith by agitation. The olive oil and oil bergamot are next added to the mixture and thoroughly incorporated therewith by agitation. The tonic is then ready for use and is bottled or otherwise prepared for market.

Having thus described the invention what is claimed as new is:

The process of preparing a hair tonic substantially as herein set forth the same consisting of mixing sage leaves, water and magnetic iron oxid in a suitable vessel and raising the same to the boiling point and maintaining the mixture at the boiling point for approximately one hour, then permitting the mixture to cool and straining or filtering the decoction, then adding alcohol to the decoction and thoroughly incorporating the same therewith and finally adding to the mixture olive oil and oil bergamot and agitating the mixture to insure a thorough incorporation of the ingredients.

In testimony whereof we affix our signatures in presence of two witnesses.

EDITH M. WATERMAN. [L. S.]
NETTIE BROWN. [L. S.]

Witnesses:
H. J. MILLER,
J. BONNER.